United States Patent [19]

Jalas

[11] 4,354,775
[45] Oct. 19, 1982

[54] PNEUMATIC LINE CLEAN OUT DEVICE

[76] Inventor: Leon C. Jalas, Rte. 1, Sutherland, Iowa 51058

[21] Appl. No.: 176,517

[22] Filed: Aug. 8, 1980

Related U.S. Application Data

[63] Continuation-in-part of Ser. No. 969,993, Dec. 15, 1978, abandoned.

[51] Int. Cl.³ .............................................. B65G 53/66
[52] U.S. Cl. ......................................... 406/3; 406/11; 221/278
[58] Field of Search .................. 222/148, 630; 221/2, 221/13–15, 21, 278; 406/3, 11, 28

[56] References Cited

U.S. PATENT DOCUMENTS

| | | | |
|---|---|---|---|
| 2,554,583 | 5/1951 | McFall | 406/3 |
| 2,793,083 | 5/1957 | Oetiker | 406/11 |
| 3,455,588 | 7/1969 | Frantz | 222/148 |
| 3,891,120 | 6/1975 | Loesch et al. | 221/278 |

*Primary Examiner*—H. Grant Skaggs

[57] ABSTRACT

A device for cleaning blockages of a pneumatic tube for carrying seeds or similar particulate matter comprising a sensing device adapted to sense the blockage, a gate in the tube adapted to be opened in response to the sensor and a pneumatic device to blow the seed or other matter out of the tube. A time delay relay may be used to prevent unwarranted recycling of the gate opening and pneumatic devices.

8 Claims, 6 Drawing Figures

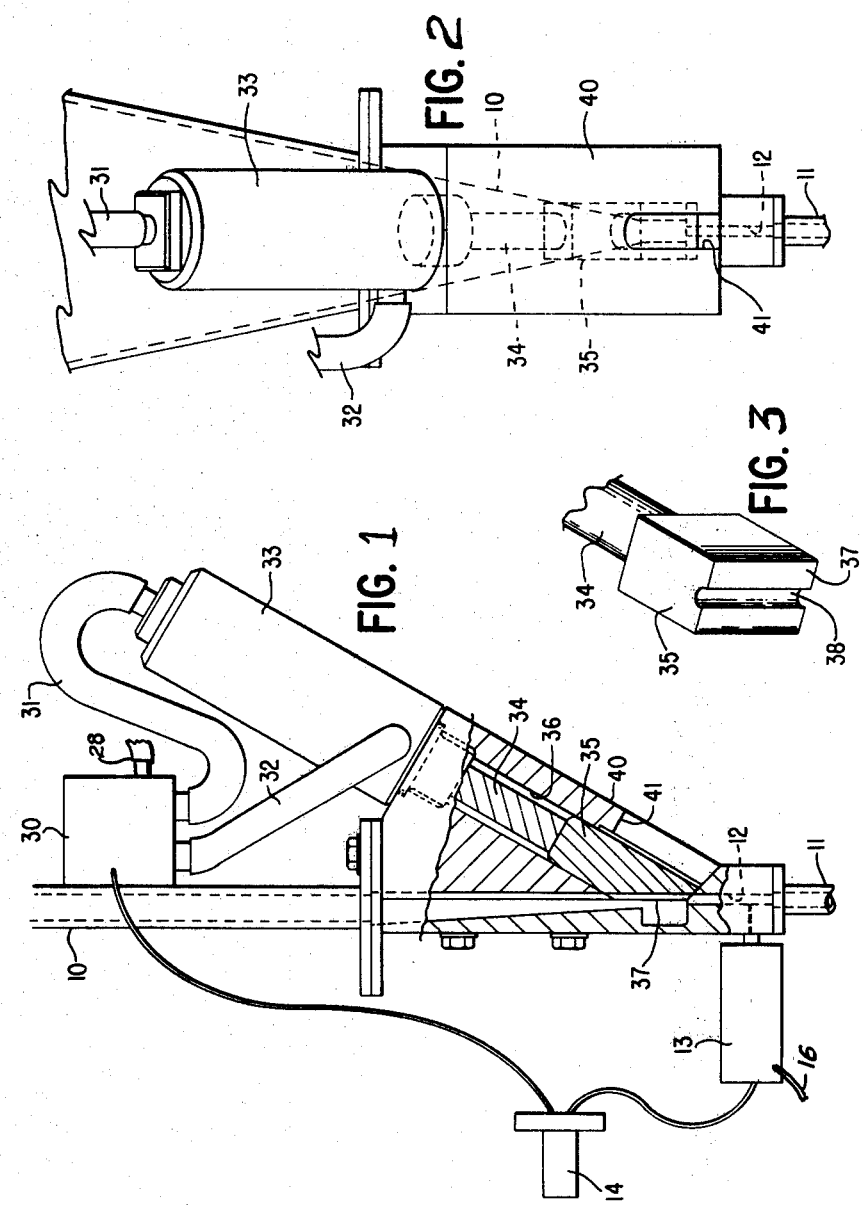

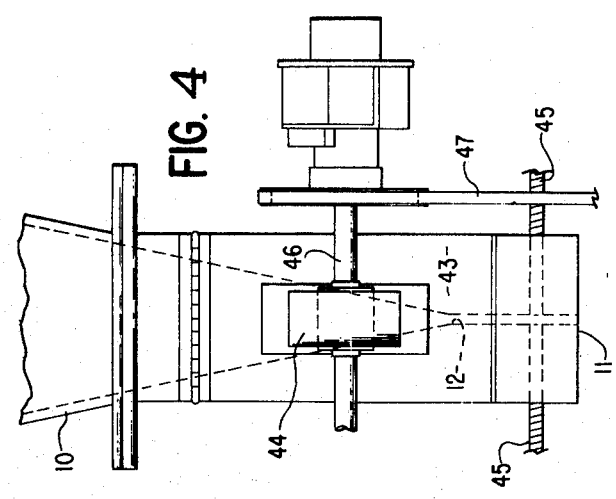
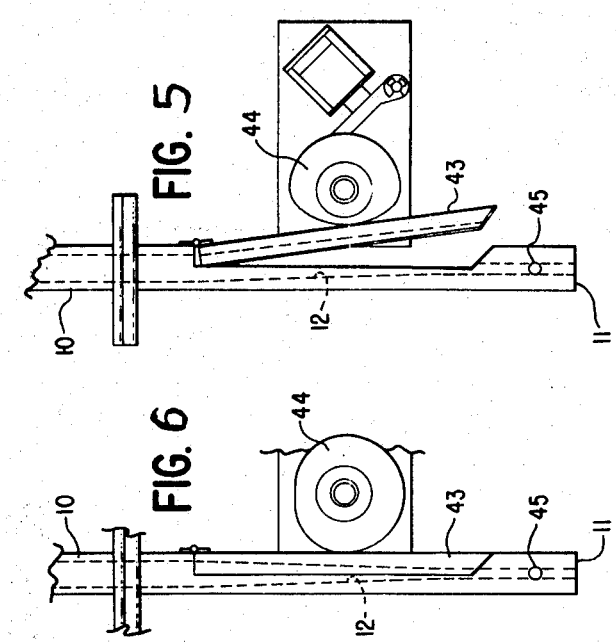

PNEUMATIC LINE CLEAN OUT DEVICE

BACKGROUND AND SUMMARY OF THE INVENTION

This invention is concerned with the pneumatic transportation of individual particles such as seeds through a tube, and is a continuation in part of my application, Ser. No. 969,993, filed Dec. 15, 1978 and now abandoned. A particular type of such transportation is illustrated in my U.S. Pat. No. 4,029,238, issued June 14, 1977.

This patent requires that seeds be individually fed down a tube into a nozzle at a fairly rapid rate of speed. The seeds are propelled principally by pressured air behind the seed in the tube, although some acceleration may be obtained by the use of an aspirator device.

One of the problems arising from the use of such a device is a blockage of the tube which shuts off all flow of particles down the tube. Such blockage, if it lasts for any considerable time can completely annul any advantage of speed my device might have. Therefore, it is essential that such blockages be avoided. Total avoidance of blockage seems virtually impossible. Therefore, I have provided means to hold the blockage time to a minimum.

My invention essentially is an automatic cleaning device adapted to blow the offending particle out of the channel which is blocked. In order to accomplish that automatically, it is necessary to provide some means for quickly establishing the fact that there is a blockage and then a means for clearing the blockage. It is also desirable that the cleaning device operates only as often as and for as long as there is a blockage and therefore I provide timers adapted to control the recycling.

FIGURES

FIG. 1 is a front elevational view of my device in a form adapted for principally pneumatic operation, FIG. 2 is a side view of the device of FIG. 1, FIG. 3 is a pictorial view of the plug of the device of FIGS. 1 and 2 removed from the rest of the assembly, FIG. 4 is a front elevational view of an alternate device having partially mechanical operation, FIG. 5 is a detailed side elevational view of a part of the device of FIG. 4 showing an open gate, and FIG. 6 is a view similar to FIG. 5 with the gate closed.

DESCRIPTION

Briefly my invention comprises a chute or similar means for carrying particles such as seeds. Sensing means in communication with the chute is adapted to sense when there is a blockage in the chute and actuate the unblocking means. The unblocking means is principally a gate and an opening device which will open the gate when the channel in the chute is blocked and pneumatic means adapted to blow the blocking particle free from the chute and out of the gate.

More specifically, and referring to the drawings, I illustrate a chute 10 leading to a nozzle 11 through which particulate material such as seeds may pass. The chute 10 is essentially a two-dimensional formation having a flat front wall and back wall spaced apart approximately the distance equal to or slightly larger than a diameter of the particles being run through the device. In a device such as the one which is the subject of my patent noted before, the seeds or other matter are driven down the chute 10 and into the nozzle 11 by air pressure. So long as the flow of seeds is constant, there is at least a slightly elevated air pressure in the tube 12 upstream of the nozzle 11. If the passage becomes blocked, the pressure in the tube 12 downstream of the blockage rapidly drops to nearly that of the ambient air. Thus the pressure in the tube 12 a little way upstream of the tip of the nozzle 11 becomes a good indicator of blockage.

I use this feature in my device by providing a pressure sensor 13 in communication with the tube 12 by any substantial change is quickly sensed. The sensor may be any pressure sensitive relay which is sensitive to small changes in pressure and which then will actuate a switch or relay, not shown, in response to a slight drop in pressure. The relay is connected to a power source by means of a wire 16. When the pressure in the tube 12 drops slightly because of an upstream blockage, the switch allows power to flow from a power source through the relay actuating a time delay relay or timer 14. This timer is of the type which holds a position for a fixed time and then recycles to its original condition. I have used a timer manufactured by Macromatic, Inc. and called Macromatic Solid State Time Delay Relay, Model SS11822B although there are other similar timers or relays.

The timer 14 is electrically connected to an electrically operated air valve 30 adapted to direct compressed air entering the valve through a tube 28 from a compressor or air tank, not shown, alternatively into one of two tubes 31 and 32 adapted to operate a pneumatic piston and cylinder device 33. This type of valve may be solenoid operated with a simple two way valve to direct air pressure normally into one line and then, if actuated, to direct the pressure into an alternate line. Normally, the pressure is directed to the first line 31 which tends to press the piston of the pneumatic device downwardly. The piston is connected by a rod 34 to a plug device 35.

The plug 35 is slidable within a channel 36 so that operation of the piston will be effective to slide the plug 35 back and forth in the channel 36. One face 37 of the plug 35 is formed to close an opening in the walls of the tube 12. It is also formed with a groove 38 which forms a portion of wall of the tube 12. Thus, the tube 12 is essentially cylindrical all the way to the nozzle 11.

An outer wall member 40 encloses the channel 36 and supports the cylinder 33. This member is formed with an opening 41 which is normally closed by the plug 35. However, when the plug 35 is withdrawn by action of the piston and cylinder mechanism 33, the opening is cleared. The plug 35 also forms a part of the wall of the tube 12. Therefore, when the plug is withdrawn, the tube 12 is completely opened through the opening 41.

In operation, the sensor 13 senses a drop in pressure. This actuates the timer 14 which in turn changes the air valve 30 and causes it to redirect air pressure into the tube 32 and release it from the tube 31. The piston then withdraws the plug 35 opening the tube 12. The plug 35 is installed at the point where the chute 10 narrows down into the tube 12 where blockage is most apt to occur. Therefore, when the tube 12 is opened by withdrawal of the plug 35, the air behind the blockage will simply blow the offending particle out through the opening 41. The timer will then recycle to cause the plug 35 to be moved back into place and held there until air pressure can be built up to prevent the pressure sensor from causing an immediate recycling. A second time delay relay similar to the timer 14 may be used in a manner well understood in the electrical arts to block immediate recycling of the first timer.

A modification of my preferred embodiment is shown in FIGS. 4–6. In this modification, the tube 12 is formed in a chute 10 and ends at a nozzle 11. However, in place of the plug 35 previously described, I provide a gate 43. This gate 43 is held closed by a cam 44 in a manner similar to the operation of the piston and cylinder mechanism 33. I envision also that a photo-cell sensor 45 might be used in place of a pressure sensor. It will be obvious that still other types of sensors may be used without departing from the scope of my invention. In other respects, the operation of this device is similar to that of the previously described embodiment. The cam 44 may be driven through a shaft 46 from a belt 47 or directly by a motor—either electric, or pneumatic. The motor, not shown, is in turn controlled by the time delay relay or timer 14 which will cause it to operate for a specific length of time and then allows the device to revert to its original position. Other details of this mechanism should be well within the capabilities of those skilled in the art based on previously described devices.

I claim

1. In combination with a device for the pneumatic injection of seeds into the ground including an enclosed seed pathway comprising a chute for conveying seeds to a nozzle; and a pneumatic pressure source adapted to provide pressure to move said seeds through said pathway means for cleaning a blockage in said nozzle caused by blocking material becoming lodged in said pathway comprising closure means adapted to close a discharge opening formed in said enclosed pathway, said closure means being openable to allow ejection of the blocking material, sensing means communicating with said pathway to sense a blocking situation and operably connected with said closure means to open said closure means upon the sensing of a blockage, said opening being located to allow pneumatic pressure from said source to blow the blocking material out of said opening.

2. The device of claim 1 in which time delay means is also operably connected between said closure means and said sensing means to prevent recycling of the closure means within the time cycle of said time delay means.

3. The device of claim 2 in which said sensing means is a pressure sensitive device adapted to sense a change in the pneumatic pressure in said nozzle.

4. The device of claim 2 in which said sensing means is a photo-cell sensor adapted to sense a substantial gap in the flow of material through said nozzle.

5. The device of claim 1 in which said discharge opening is formed in the wall of said enclosed pathway at the junction between said chute and said nozzle, said closure means forming a portion of the wall of said pathway, and opening means attached to said closure means and in operable connection with said sensing means whereby said portion of the wall will be withdrawn to allow said blocking material to be blown out of said pathway by the pneumatic pressure in the device.

6. The device of claim 5 in which said opening means includes a pneumatic cylinder and piston assembly, and valve means adapted to control the position and movement of said piston in said cylinder, said valve means being operably connected to said sensing means whereby said sensing means actuates opening and closing of said discharge opening in the enclosed pathway.

7. The device of claim 6 in which said closure means is a plug slidably movable by said cylinder and piston assembly from its normally closed position forming a portion of the wall of said pathway to an open position in which said pathway is open to the ambient atmosphere.

8. The device of claim 5 in which said closure means includes a gate means, said opening means including cam means engaging said gate means to hold said gate means in its normally closed position, operating means adapted to operate said cam means to open said gate means, said operating means being operably connected to said sensing means and acting in response to signals therefrom.

* * * * *